C. BORNMANN.
CAMERA.
APPLICATION FILED MAY 6, 1916.

1,213,731.

Patented Jan. 23, 1917.

Inventor.
Carl Bornmann.
By his Attorney
Phillips Abbott.

UNITED STATES PATENT OFFICE.

CARL BORNMANN, OF BINGHAMTON, NEW YORK, ASSIGNOR TO ANSCO COMPANY, OF BINGHAMTON, NEW YORK, A CORPORATION OF NEW YORK.

CAMERA.

1,213,731.      Specification of Letters Patent.      Patented Jan. 23, 1917.

Application filed May 6, 1916. Serial No. 95,763.

*To all whom it may concern:*

Be it known that I, CARL BORNMANN, a citizen of the United States, and a resident of the city of Binghamton, county of Broome, and State of New York, have invented certain new and useful Improvements in Cameras, of which the following is a specification.

In order that the utility and value of this invention may be appreciated, it will be expedient to briefly refer to certain matters pertaining to the photographic art as practised today.

During recent years the use of small or so-called pocket cameras, particularly by the amateur public, has very greatly increased and to make such small or compact cameras capable of doing really good work, they should be fitted with a high grade or anastigmat lens with a suitable working aperture, say F—4.5 and in order that the full utility of the anastigmat lens may be realized, it is necessary that some means for focusing be provided, otherwise it is little better than an ordinary fixed or universal focus lens, yet of greatly increased cost.

It is the purpose of this invention, therefore, to construct focusing devices in such compact, easily manipulated and mechanically substantial form that they may be practically employed in cameras of even the smallest size, so that the full advantages of anastigmat lenses may be successfully and conveniently realized.

Figure 1:
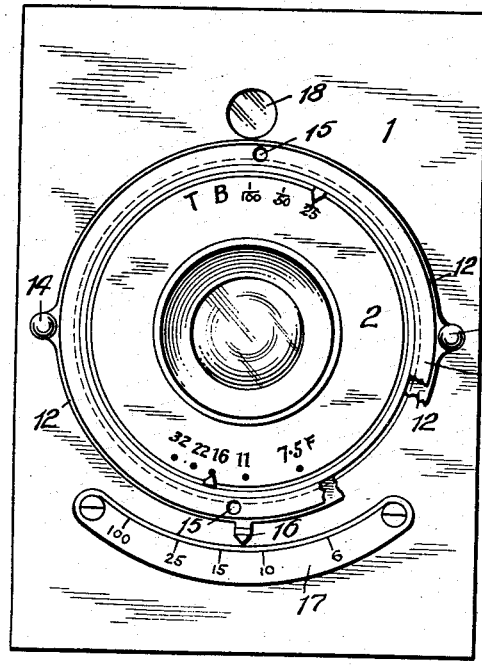
Figure 4:
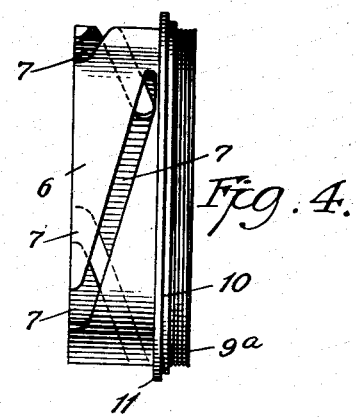
Figures 2, 3:
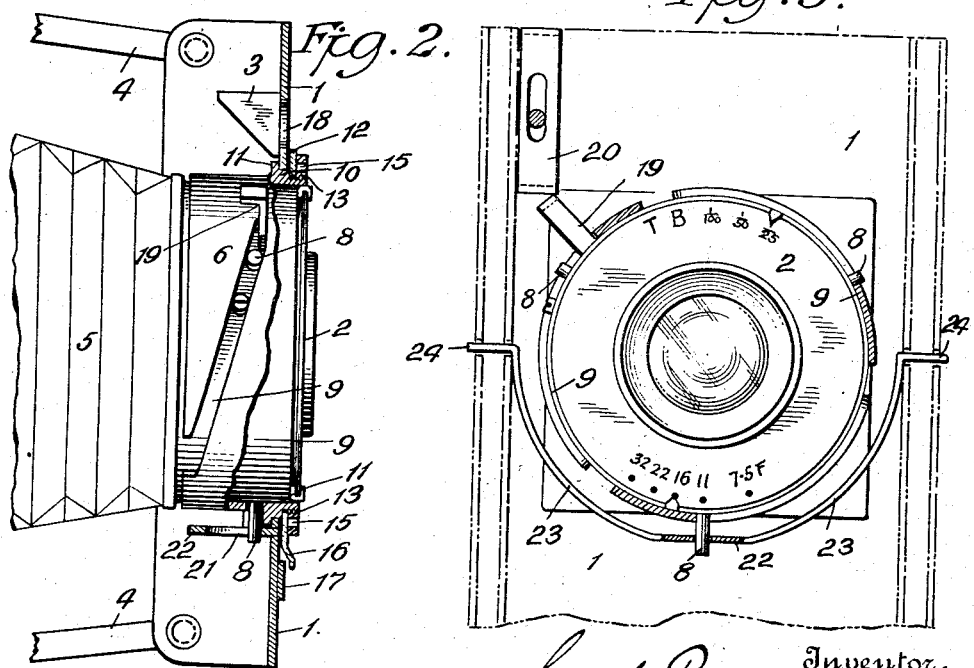

Referring to the drawings, Figure 1 is a front elevation of the front board of an ordinary folding pocket camera somewhat enlarged. Fig. 2 is a side elevation of that which is shown in Fig. 1, partly in section and partly broken away; Fig. 3 is a front elevation of that which is shown in Fig. 1, the front board being removed and disclosing the parts lying in rear of it; Fig. 4 is a detail, showing the slotted sleeve separated from the other parts, and which, co-acting with its associated parts, effects the projection and retraction of the lens casing.

In the drawings, 1 represents the movable front board of the camera to the rear of which the bellows is attached and upon which the lens and shutter casing 2 is supported. As shown, it is provided with the usual index plates and indices useful for the shutter, the diaphragm and focal attachments.

3 is the finder.

4, 4, see Fig. 2, are the supporting arms for the front board, 5 the bellows.

6 is a slotted sleeve or collar, 7 being the slots therein through which pins or screws 8, three in the present instance, work. These pins are set into the side 9 of the lens casing. The sleeve is best shown in Fig. 4. It comprises the collar like part 6 above referred to, in which the diagonal slots 7 are made. Its front edge is threaded as at 9ª and at the base of the threading there is a shoulder 10, and in rear of that shoulder, another shoulder 11, which fits against the back of the front board 1, and against the shoulder 10 (see Fig. 2) there is a ring 12 pressed with requisite force by a jam ring 13 and upon the ring 12 there are two small upwardly projecting knobs 14 (see Fig. 1). The jam ring 13 is preferably provided with two holes 15, in which a spanner wrench may engage for the purpose of turning the jam ring down upon the ring 12 with the requisite pressure. The ring 12 is likewise provided with a pointer, which co-acts with the indices or other designations on the scale 17, as shown in Fig. 1.

18 is the lens opening for the finder.

19 is the shutter lever which is actuated by a push plate 20 (see Fig. 3) accessible from the outside of the bellows in the usual manner.

It will be noted that one of the pins 8, the lower one shown in Fig. 3, is made longer than the other two. This is so that it may pass through a slot 21 made in a projecting part 22 of a continuous spring structure 23, the terminals 24 of which are formed into spring catches to retain the front board 1 in its closed position when the camera is collapsed and not in use. This catch feature forms no part of this invention, but it is essential that the pin 8 engaging in some fixed slotted part, or an equivalent structure, be present, so as to assure the forward and rearward movement of the lens casing bearing the lens, by transforming the rotary movement of the sleeve into forward and rearward movement of the lens bearing structure.

The operation of the apparatus is as follows: During the assemblage of the parts, as intimated above, the ring 12 is pressed down upon the shoulder 10 of the sleeve 6 by the jam ring 13 with such force that any movement applied to the ring 12 by pressure with the thumb and finger upon the small knobs 14, will compel the same movement on the part of the slotted sleeve. The operator, after having projected the front board of the camera in the usual manner, so that the lens is generally, but not exactly in focus, in order to realize the full benefits possible with a high grade or anastigmat lens, i. e., rapidity and sharpness, secures exact focus in the following manner; with the thumb and finger of one hand applied to the small knobs 14, he rotates the ring 12 and consequently the slotted sleeve 6 to the right or left, as the case may be, whereupon, in a manner well understood, the lens casing, bearing the lens and shutter with it, will move toward or away from the focal plane as the case may be, the operator meantime observing the effect of such movement in the finder. In this way exactitude and realization of the full advantages flowing from the use of expensive lenses may be had; and it will be noted that the construction is such that the focusing device is adapted to cameras of the smallest size because there is no projection of any part, either lateral or longitudinal, beyond the space required by the other parts necessarily present, the small knobs 14, 14, having no greater and usually less forward projection than the lens confining devices.

It will be obvious to those who are familiar with such matters that to some extent modifications may be made in the details of construction and yet the essentials of the invention be retained. I therefore do not limit myself to such details.

I claim:

In a camera a focusing device comprising a movable front to which the bellows is attached, a diagonally slotted sleeve, a longitudinally movable lens casing located within the slotted sleeve and provided with projecting parts adapted to work through the slots of the sleeve, both the sleeve and the lens casing being supported upon said movable front, means to prevent rotary and to compel axial movement by the lens casing, a shoulder on the sleeve adapted to engage with the rear of the movable front, a reduced forwardly projecting part of the sleeve adapted to pass through an opening in the movable front, a shoulder upon said reduced part projecting forwardly beyond the last named shoulder, a ring provided with knobs adapted to be seated upon said last named shoulder, a scale on the movable front, and a pointer upon said ring coöperating with said scale.

In testimony whereof I have signed my name to this specification.

CARL BORNMANN.